United States Patent [19]

Thissen et al.

[11] Patent Number: 4,720,149

[45] Date of Patent: Jan. 19, 1988

[54] MOUNTING MEANS FOR MOUNTING BALANCE WEIGHTS ON A MOTOR VEHICLE WHEEL

[75] Inventors: Werner P. Thissen; Karl H. Schillings, both of Goch, Fed. Rep. of Germany

[73] Assignee: International Technical Research S.A.H., Luxembourg

[21] Appl. No.: 775,215

[22] Filed: Sep. 12, 1985

[30] Foreign Application Priority Data

Sep. 13, 1984 [DE] Fed. Rep. of Germany ... 8426961[U]

[51] Int. Cl.⁴ .......................... B60B 7/02; B60B 13/00
[52] U.S. Cl. .................................. 301/5 B; 301/37 T
[58] Field of Search ................. 73/457, 458, 470, 487; 301/5 B, 37 T

[56] References Cited

U.S. PATENT DOCUMENTS

| | | | |
|---|---|---|---|
| 2,345,283 | 3/1944 | Mulhern | 301/5 B |
| 2,485,936 | 10/1949 | Stroberg | 301/5 B |
| 3,890,008 | 6/1975 | Lejeune | 301/5 B |
| 3,891,276 | 6/1975 | Spisak | 301/37 R |

FOREIGN PATENT DOCUMENTS

| | | | |
|---|---|---|---|
| 0062130 | 10/1982 | European Pat. Off. . | |
| 576351 | 4/1933 | Fed. Rep. of Germany | 73/487 |
| 2522149 | 11/1976 | Fed. Rep. of Germany . | |
| 1131955 | 3/1957 | France | 301/5 B |
| 1418627 | 12/1975 | United Kingdom | 301/5 B |

*Primary Examiner*—John Chapman
*Attorney, Agent, or Firm*—Leydig, Voit & Mayer

[57] ABSTRACT

For mounting balance weights on a motor vehicle wheel, a wheel rim 1 including wheel nave 2, rim well 3 and rim flange 4 is used wherein a continuous, outwardly opening groove 10 for accommodating the balance weights 20 is formed in the region of the rim flange intermediate rim well and wheel nave. This groove and the balance weights optionally disposed therein are camouflaged by an annular cover 30 that is adapted to be releasably clamped to the wheel rim via projection 34. Matching balance weights are configured as annular segments 20 adapted to be secured inside the groove.

10 Claims, 11 Drawing Figures

MOUNTING MEANS FOR MOUNTING BALANCE WEIGHTS ON A MOTOR VEHICLE WHEEL

In general, the invention is directed to the mounting of balance weights on a motor vehicle wheel.

In particular, the invention is directed to mounting means for mounting balance weights on a motor vehicle wheel comprising a wheel rim including wheel nave, rim well and rim flange, wherein in the region of the rim flange intermediate rim well and wheel nave a continuous, outwardly opening groove is formed for accommodating the balance weights.

A further aspect of the invention is directed to a mounting system comprising such wheel rim and matching balance weights.

Motor vehicle wheels must be balanced in order to eliminate an unbalance that may occur after mounting of the tire onto the rim, upon uneven tread wear and the like. Typically, balance weights are used to this end which are placed beneath the rim flange and are secured thereat by means of a clasp in overlapping engagement with the rim flange. Alternatively, the balance weights may be glued on in the region of the rim flange. When the mass ratios of the wheel vary due to non-uniform wear, size and location of the balance weights also must be re-adapted. To this end the old balance weights must be removed and fresh balance weights fitted. With the conventional measures for mounting balance weights it is hardly possible in this operation to avoid damage to the rim.

Moreover, the fact that the balance weights are visible impairs the optical appearance of the wheel rim, especially when a more extravagant light-metal rim is concerned.

British Patent No. 1,418,627 discloses a wheel rim comprising wheel nave, rim well and rim flange, wherein an outwardly opening groove for accommodating the balance weights is formed in the region of the rim flange intermediate rim well and wheel nave. To avoid impairment of the optical appearance by the presence of the balance weights it is recommended to provide the wheel rim itself with a glossy or polished finish, while the groove is kept dark relative thereto and the balance weights also are provided with the same dark colour, whereby the balance weights within the groove would be camouflaged. Securing of the balance weights inside the groove may either be non-positive due to deformation of the weight material, or a clasp may be provided which is secured to the balance weight, on the one hand, and projects beyond the groove and overlaps the rim flange, on the other hand. In any case the mounting of the balance weights may cause damage to the wheel rim, and renewed mounting of a balance weight at the same location poses a problem. Moreover, with the last-mentioned way of mounting the balance weight there is a risk that the seat of the clasp is loosened by foreign influences, such as in a car wash installation or by the rim touching the curb, so that the balance weight may be lost even though it is provided in a groove.

In view of what has been set out above, it is the object of the instant invention to simplify mounting and replacing of the balance weights and to prevent any damage to the rim even after several balancing operations in the same location. In addition to that, it is intended with the balance weight mounting means of the kind specified above to prevent any detrimental influence on the optical appearance of the wheel rim, especially of a light-metal rim, due to the presence of the balance weight and the mounting means therefor.

It is a further object of the invention to provide a mounting system for mounting balance weights on a wheel rim, said system additionally comprising matching balance weights adapted to be mounted for easy replacement at any desired location within the groove formed in the wheel rim, whereby damage to the groove and/or the wheel rim is prevented.

Further objectives, advantages and features of the invention will become apparent from the description and the claims with reference to the drawings.

Proceeding from mounting means for mounting balance weights on a motor vehicle wheel having the above-specified features, the solution of said object and objectives in accordance with the invention is characterized in that an annular cover for the groove and the balance weights optionally disposed therein is additionally provided, and said annular cover is adapted to be releasably clamped to the wheel rim via fastening means.

Especially, the wheel rim may be a light-metal rim having a flat rim flange, and the matching embodiment of the invention comprises an annular cover having angular cross-sectional profile with a relatively wide, radially extending first leg covering the groove and a relatively narrow, axially extending second leg provided on the inner or outer periphery. In this case the fastening means preferably is a continuous projection formed integrally with the inside of the second leg, said projection being adapted to engage in an annular recess on the inner or outer side of the rim flange, whereby the cover undergoes elastic deformation.

A further aspect of the invention relates to a mounting system for mounting balance weights on a motor vehicle wheel. In addition to a wheel rim having the above-specified features and the annular cover of special design provided in accordance with the invention, there are provided matching balance weights adapted to be secured for easy replacement within the groove formed in the wheel rim. Preferably, these balance weights are annular segments whose cross-section and ring diameter are matched to the dimensions of the groove. It is especially preferred that these balance weights, which are configured as matching annular segments, comprise a friction material along one edge thereof, so that a readily detachable and yet reliable mounting at the predetermined location within the groove is ensured without additional fastening means.

The annular cover masks the groove in the wheel rim and hides the balance weights. Even if such balance weights are provided, they will not be visible to an observer and cannot have a detrimental effect on the optical appearance of the rim. Especially, in case of a light-metal rim the visible side of the annular cover may be flush with the remainder of the rim surface, so that this cover also will be practically invisible. Furthermore, it is thereby possible to realize a smooth surface contour of the rim outside, which is advantageous in view of present endeavours towards drag coefficient optimization. The visible rear side of the annular cover constitutes a facing which may be integrated in the wheel rim design in respect of material and/or optical appearance. The balance weights masked by this facing may easily and rapidly be secured within the groove and replaced as required without any damage to the groove and/or the rim. Therefore the invention permits simple, rapid and repeated balancing of a motor vehicle wheel without interfering with the optical appearance of the wheel rim, especially a light-metal rim. In practice, an invisible mounting means for mounting balance weights is provided.

Further advantageous embodiments and improvements of the invention relate to the configuration and mounting of the annular cover on the wheel rim, and to special matching balance weights as set out in detail in the subclaims.

Thus, in the region of the rim flange, i.e. intermediate rim well and wheel nave, a continuous recess may be formed in the wheel rim for engagement of the mounting means therein. The mounting means is/are preferably provided on the outer periphery of the annular cover, and to securely clamp the cover to the wheel rim the mounting means is/are urged into said recess, whereby the annular cover undergoes a slight elastic deformation. Such mounting means may, for example, be resilient tabs provided in relatively spaced relationship along the outer periphery of a substantially flat annular cover and engaging with the resilient leg in a matching continuous recess in the wheel rim.

Preferably, a continuous flange is formed integrally with the inner or outer periphery of the annular cover, and either one or several projections extending from the inside of said flange are used as fastening means. In this connection either a single continuous projection or plural relatively spaced projecting sections may be provided.

The continuous projection may, for example, have wedge-like cross-section and latch into a matching wedge-like recess in the region of the rim flange, whereby a so-called watch-cover latching is realized.

If required, elastic sealing means such as a rubber strip or the like may be inserted into the annular recess. This ensures a resilient, elastically retained seat of the annular cover on the wheel rim, and ingress of dirt into the groove is prevented.

On the inner wall of the groove remote from the recess a continuous step may be formed in which an edge portion of the annular cover may be supported. Preferably, the height of said step corresponds to the thickness of the cover material, such that an aligned, hardly visible transition between the cover and the remainder of the rim surface is provided.

In accordance with another alternative, the cover is a flat, annular disk portion, and a number of clamping elements is provided to mount the same on the wheel rim, said clamping elements being either distributed in relatively spaced relationship over the ring periphery or formed integrally therewith and being adapted to be clamped to the wheel rim. Such clamping elements may, for example, be spring clips which are retained in the flutes defined by the two bent edges of the cover and which engage in recesses in the wheel rim, such as in the groove for accommodating the balance weights or in a recess extending continuously in parallel thereto. Alternatively, the clamping elements may be clamping pads of rubber or another elastically deformable material whose dimensions slightly exceed the cross-sectional profile of the groove, such that after urging of said clamping pads into the groove a reliable frictional engagement will be obtained. Such clamping pads may be glued to the inside of the cover or otherwise secured.

In accordance with a further alternative the clamping elements may be punched folds or inwardly turned punch-outs of the annular cover, which engage resiliently in one or several matching recesses in the wheel rim. In order to ensure that also in this case the cover constitutes an optically attractive facing, the annular cover is preferably composed of two or more layers, and merely the inner layer or layers include said punched folds or punch-outs. The outer layer is continuous or uninterrupted and serves as facing masking the groove.

In order to elevate the seat of the clamping elements, such as the mentioned spring clips, rubber pads, punched folds, inwardly turned punch-outs or the like, at least one wall of the groove, preferably the outer wall thereof, may be provided with an undercut and the clamping elements may have a matching profile. Thereby an even more reliable clamping fit may be ensured, which draws the annular cover towards the wheel rim. Nevertheless, by applying a tool such as a screwdriver or the like it is easily possible to remove the annular cover, if required, from the wheel rim, for instance when the arrangement and/or number of balance weights is to be changed.

The groove may be arranged at any desired location between rim well and wheel nave. Preferably, the arrangement is selected such that the maximum possible ring diameter of the groove is obtained, the groove is easily accessible, and the groove together with the cover according to the invention is integrated in the rim design.

A substantially rectangular profile has proven satisfactory for the groove in the wheel rim, wherein the groove width is in excess of the groove depth. The transition from the groove walls to the groove bottom may be rounded in order to facilitate painting and to reduce susceptibility to corrosion. Typically, the groove may have a width of about 10 to 20 mm. The ring width of the annular cover should preferably be about 12 to 25 mm such that the annular cover completely overlaps such a groove. Typically, radially oriented webs, which merge into the profile of the wheel nave, are provided at the rim portion formed with the groove, said webs extending inwardly towards the wheel axle. An annular cover having the above-specified dimensions forms the outer edge of such a profiled light-metal rim and enhances the optical appearance thereof.

The choice of materials for the annular cover is not particularly limited. For example, said cover may be made of metallic material such as thin sheet-metal of stainless steel; furthermore, said cover may be made of light metal such as aluminium or an aluminium alloy; such light-metal covers are especially considered in conjunction with a light-metal rim. Advantageously, wheel rim and cover should be made of the same metallic material so as to avoid corrosion-promoting local elements. Furthermore, the cover may be made of a durable plastics material. If required, the entire plastics ring or at least the visible surface thereof may be provided with a thin metallic coating that matches the appearance of the rim. Also, the cover may have a dual-layer or multi-layer structure, especially when sections of the inner layer(s) are used as fastening means for the cover on the wheel rim.

As already indicated above, matching balance weights are preferably used to balance the motor vehicle wheel, which may be secured in the groove formed within the wheel rim. To this end, commercially available adhesive weights may be used which are provided on one main surface with adhesive that is protected by stripfilm. These commercially available adhesive weights are manually matched as required to the groove dimensions. Preferably, these balance weights are ring segments made as known per se of lead or a lead alloy. Diameter and cross-sectional profile of the ring segments are matched to the groove dimensions, so that the ring segments may be disposed inside the groove while mounting of the annular cover is not impeded thereby.

Preferably, the ring segments provided in accordance with the invention are formed with predetermined breaking points extending at regular intervals in radial direction. By corresponding arrangement of these predetermined breaking points every ring segment may consist of a set of plural interconnected individual weights of different weight. In practice, balance weights weighing about 30 to 50 g are frequently required. To permit maximum adaptation to the balance weight actually required for balancing it is possible, for example, to provide several single weights each weighing 2, 5 and 10 g, respectively. Such balance weights permit more accurate balancing than has been possible with the balancing weights available so far.

To fix the annular segments inside the groove, the respective dimensions may be matched to each other such that the annular segments may be inserted in the groove practically without any play. Then, a small pad of rubber or another elastic material with a profile slightly in excess of the groove dimensions is urged into the groove at either end wall of an annular segment and reliably retains the annular segment in the desired location.

Alternatively, the portion of the annular segment made of lead or the like may be narrower than the groove, and at least one peripheral wall of such an annular segment carries a material for improving frictional engagement with the groove. Such a friction material may, for example, be a serrated or toothed tape of rubber or another elastically deformable plastics material, which is fixed, preferably glued, to one peripheral wall, preferably the outer wall of the annular segments.

If one sidewall of the groove, preferably the outer wall thereof, is formed with an undercut, the corresponding peripheral wall of the annular segments, the friction material fixed thereto and/or the pads for retaining the annular segments also should have a profile matching said undercut.

By this combination of a wheel rim of predetermined design comprising a continuous groove formed in the region of the rim flange intermediate rim well and wheel nave, and of a matching annular cover masking said groove and adapted to be clampingly secured to the wheel rim, and of correspondingly matching balance weights the invention provides a mounting system for mounting balance weights on a wheel rim, said system permitting easy, rapid and optically attractive mounting of said balance weights on a motor vehicle wheel. The balance weights are provided within the groove formed in the wheel rim, and the annular cover masks both the groove and the balance weights optionally disposed therein, so that the optical appearance of the wheel rim, especially of a light-metal rim, is not deteriorated. Repeated mounting of a balance weight at the same location of the rim flange is possible without causing damage to the rim at said location. Moreover, experience has shown that this mounting system permits faster balancing than is possible with the conventional balance weights, which have to be mounted on the wheel rim by means of a clasp, because corrections can be performed more easily. The mounting system according to the invention for mounting balance weights is suitable for both static and dynamic balancing. Mounting of the balance weights on the rim inner side, which is otherwise typical for static balancing, may possibly be omitted so that the space is available for other devices such as the steering linkage, sensors and the like.

Below, the invention will be described in detail by means of preferred embodiments thereof with reference to the accompanying drawings, in which:

FIG. 4a and

FIG. 6a,

FIG. 6b and

Figure 1:
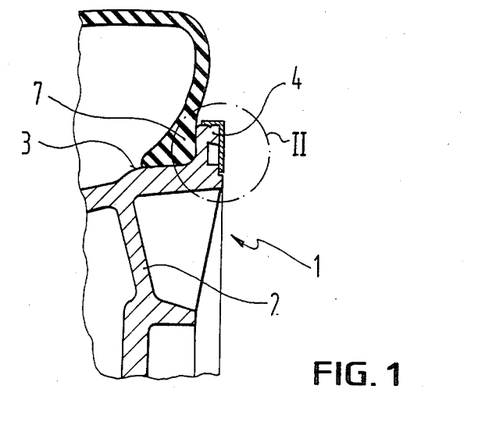
FIG. 1 is a fragmentary schematic sectional view showing the edge portion of a light-metal rim with adjacent tire bead.

Below, a first embodiment of the invention will be explained with reference to FIGS. 1 and 2.

Figure 3:
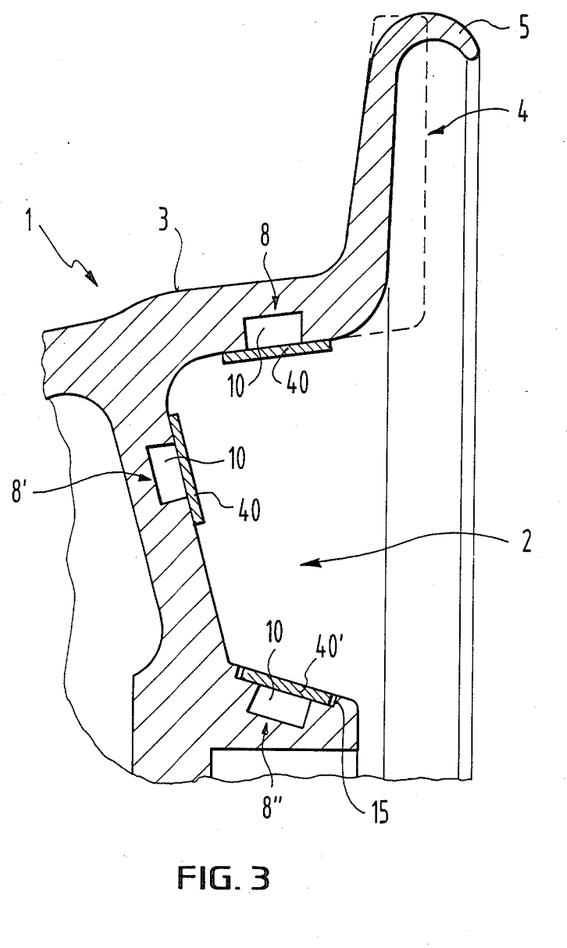
FIG. 3 is a schematic sectional view of a wheel rim with various possibilities for providing the groove and the annular cover between rim well and wheel nave.

The wheel rim 1, of which a section is illustrated, includes a wheel nave 2 adjacent the wheel axle and a rim flange 4 at the outer periphery. The rim well 3, which in case of the ready-mounted vehicle wheel is engaged by a tire bead 7, is provided adjacent the rim flange 4. In the illustrated form, the rim 1 includes a flat rim flange 4; alternatively, the rim flange could also be provided with a continuous turned-down portion 5 as shown in FIG. 3.

Figure 2:
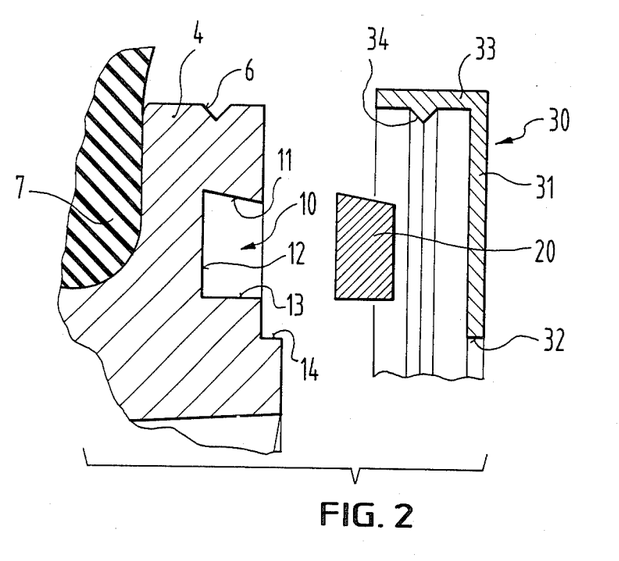
FIG. 2 is an enlarged view showing the segment II of FIG. 1.

As will be apparent from FIG. 2, a continuous outwardly opening groove 10 is recessed in the region of the rim flange 4 for accommodating balance weights 20 a certain quantity of which is secured in a given position inside the groove 10, whereby an unbalance of the vehicle wheel, that has been determined in accordance with known techniques, is balanced. Within the scope of the present invention an annular cover 30 of a given configuration is provided to cover said groove 10 and the balance weights 20 possibly disposed therein. In this way the invention provides for an "invisible" balance weight mounting wherein neither the balance weights 20 nor any cavities for accommodating the same and/or fastening means are visible.

The annular cover 30 is designed as a closed ring and has an angular cross-sectional profile including a first, relatively wide, radially extending leg 31 covering the groove 10 and a second, relatively narrow, axially extending leg 33 disposed on the outer periphery. A fastening means, viz. an inwardly extending projection 34, is formed integrally with the inside of the second leg 33. Said projection 34 may either extend continuously along the entire inner periphery of the second leg 33 or merely comprise a few relatively spaced projecting sections. Such projecting sections may be produced, for example, by a few punched notches on the second leg 33. Preferably, said projection 34 has a wedge-shaped cross-sectional profile. When the annular cover 30 has been brought in engagement with the rim flange 4 so as to cover the groove 10, the projection 34 is able to engage in a continuous cavity 6 formed on the outside of the rim flange 4. As illustrated, the profile of the cavity 6 is matched to the cross-sectional profile of the projection 34. If required, sealing means (not illustrated) may be placed in the cavity 6.

Preferably, the groove 10 for accommodating the balance weights 20 has substantially rectangular cross-sectional profile defined by the groove walls 11 and 13 as well as by the groove bottom 12. Instead of the illustrated angular transition between the bottom 12 of the groove and the groove walls 11 and 13 it is also possible to round these transitions off whereby painting is facilitated and the susceptibility to corrosion is reduced. As illustrated, the outer groove wall 11 extends at an angle to the axial direction so that there results an undercut. At the transition between the inner groove wall 13 and the rim surface, a continuous shoulder 14 is recessed in which the free end 32 of the first leg 31 of the annular cover 30 will fit when the cover has been placed on the rim flange 4.

In a preferred embodiment, a continuous groove 10 having a width of about 10 to 20 mm and a depth of about 4 to 8 mm is formed in the region of the rim flange 4 of a light-metal rim of aluminium or an aluminium alloy. As a facing for said groove 10 and the balance weights 20 optionally provided therein, an annular cover 30 made of aluminium or an aluminium alloy is used whose first leg has a width of about 12 to 25 mm; the second leg 33 preferably has a width of about 6 to 15 mm.

The groove 10 is formed on the wheel rim 1 in the region of the rim flange 4 intermediate the rim well 3 and the wheel nave 2. Depending on the design of the rim 1 and/or the shape of the rim flange 4, there are various possibilities for providing the groove 10 as illustrated, for example, in FIG. 3. Instead of the embodiment illustrated in FIGS. 1 and 2 including an angled annular cover 30 engaging about the rim flange 4, wherein the groove 10 is formed adjacent the outer periphery of the rim flange 4, it would also be possible to form the groove 10 along tighter circles 8, 8' or 8". In this case the circle 8 extends approximately at the level of the rim well 3, the circle 8' extends in the transitional region intermediate wheel nave 2 and rim flange 4, and the circle 8" extends in the region of the wheel nave 2. In each case the respective groove 10 is covered by an annular cover 40 which is either flat or matched to the rim profile and which may either rest on the rim surface or may be countersunk and flush with the rim surface, as illustrated for the annular cover 40' in the region of the circle 8". In the latter case, the rim material has formed therein not only the groove 10 for accommodating the balance weights but also a recess 15 matched thereto for receiving the annular cover 40'.

Figure 4A:
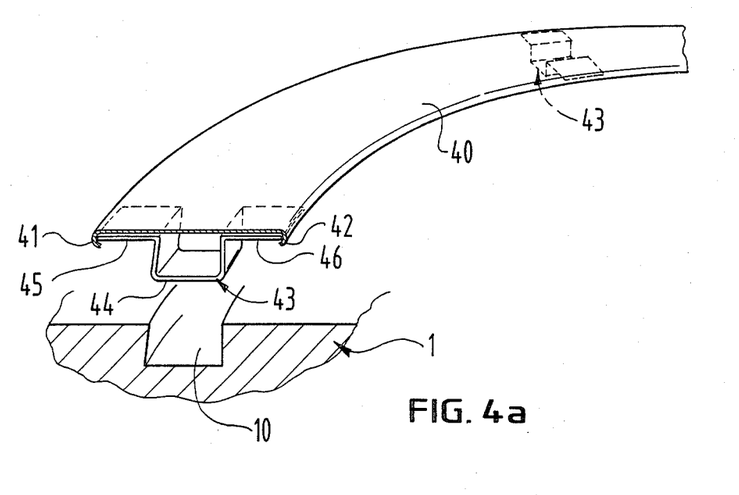
Figure 4B:
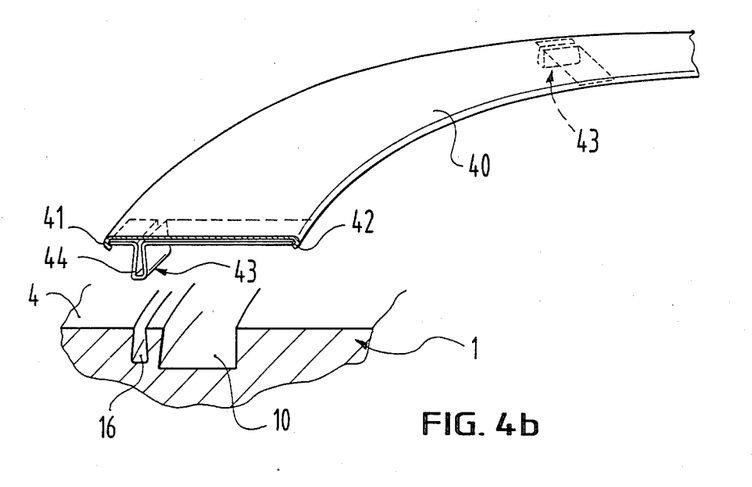
FIG. 4b show an alternative embodiment for the configuration and mounting of an annular cover.

Especially with the cover 40, which consists of a flat annular disk portion, it is possible to provide an alternative form of mounting such as illustrated in FIGS. 4a and 4b. On one main surface of the substantially flat, annular cover 40 a number of resilient clamping elements adapted to be secured to the wheel rim 1 are either integrally formed or provided at regular relative spacings about the annulus of the cover 40. For example, said clamping elements may be spring clips 43 made of spring steel or another resilient material, the opposite end portions 45 and 46 of said elements being respectively supported in a flute defined by the bent longitudinal edges 41 and 42 of the cover 40. Each spring clip 43 includes an integrally formed clamping portion 44 adapted to fit in clamping engagement in a matching recess formed on the wheel rim. In the spring clip 43 shown in FIG. 4a, the shape of the clamping portion is matched to the profile of the groove 10 and is resiliently secured within said groove 10. Such an embodiment is preferably used. Alternatively, the spring clip 43 shown in FIG. 4b is provided with a relatively narrow, dovetail-like clamping portion 44 which is formed adjacent the outermost end 45 and adapted to engage in a continuous recess 16 formed in the region of the rim flange 4 in spaced relationship to the groove 10 on the wheel rim 1.

Figure 5:
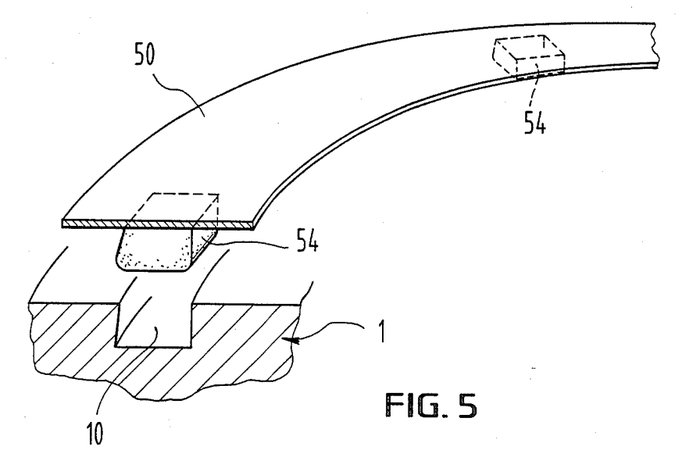
FIG. 5 is a further alternative embodiment for the configuration and mounting of an annular cover.

Instead of the spring clips 43 illustrated in FIGS. 4a and 4b, clamping elements constituted by formed parts 54 of rubber or another elastic material may be provided on the main surface of an annular cover 50 as shown in FIG. 5, said main surface facing inwards towards the rim. The cross-section of said formed parts 54 is chosen such that the formed parts may securely clampingly engage in bores, recesses or the like that are formed within the wheel rim 1. Such recesses may either be an uninterrupted continuous recess or may be single bores provided in relatively spaced relationship on a circle in the region of the rim flange 4. For releasable clamping engagement within such bores or recesses, the formed parts 54 may be provided with a profile matched to a dovetail or pine tree. According to the embodiment illustrated in FIG. 5, said formed parts 54 have a profile slightly in excess of the cross-sectional profile of the groove 10, and for clampingly securing the annular cover 50 to the wheel rim 1 said formed parts 54 are urged into the groove 10 while undergoing elastic deformation.

Figure 6A:
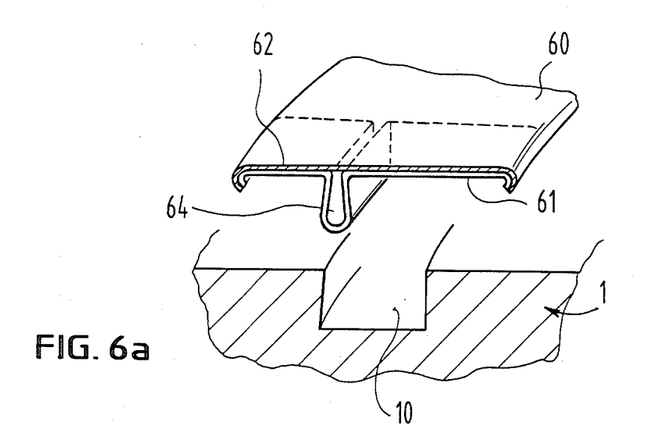
Figure 6B:
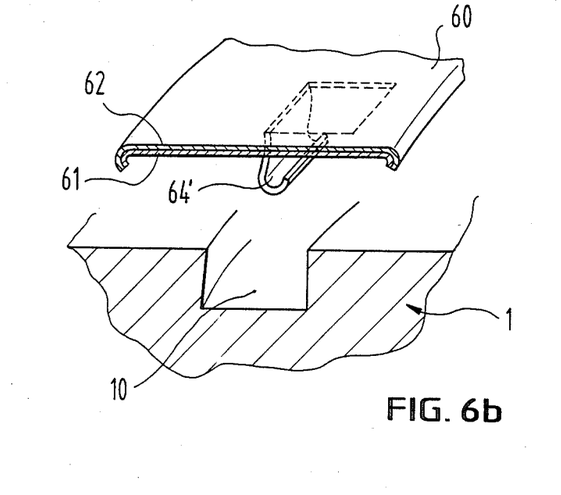
Figure 6C:
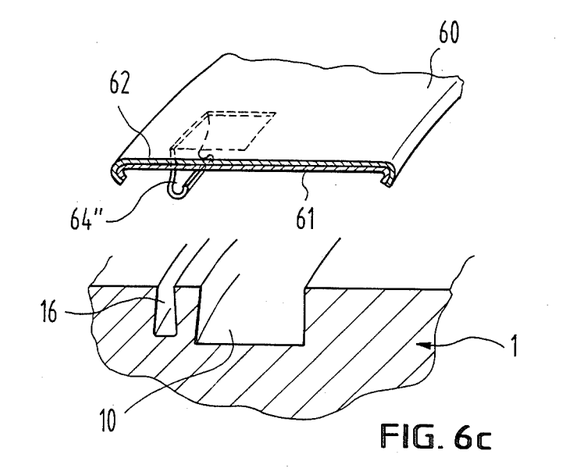
FIG. 6c show a still further embodiment for the configuration and mounting of an annular cover.

Instead of additional spring clips or elastically deformable formed parts, an annular cover 60 which in this case appropriately is made of thin sheet metal may be provided at regular intervals with punched folds 64 or punch-outs 64', 64" which either engage in the continuous groove 10 or in a continuous recess 16 extending in parallel thereto on the wheel rim 1 (see the FIGS. 6a, 6b and 6c). In such a case the cover 60 is advantageously configured as a dual-layer or multi-layer laminate, and the inner layer 61 (or inner layers) constitutes the punched folds 64 or the punch-outs 64' and 64", respectively. The inner layer(s) 61 is/are coated with at least one continuous cover layer 62, which ensures the optically attractive appearance of a facing.

Figure 7:
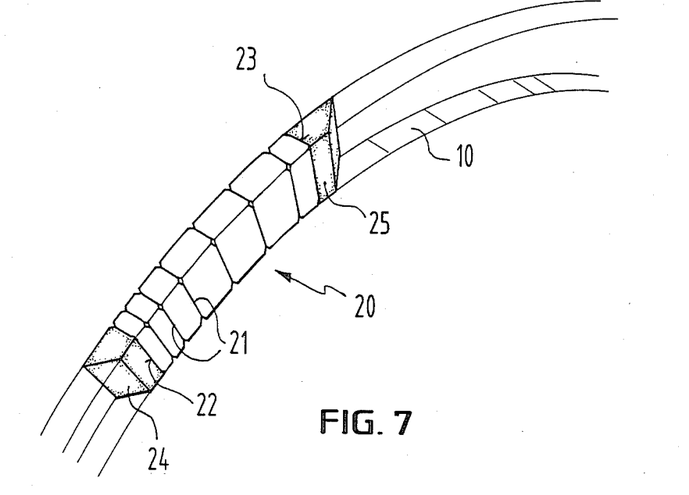
FIG. 7 is a first embodiment of a balance weight.
Figure 8:
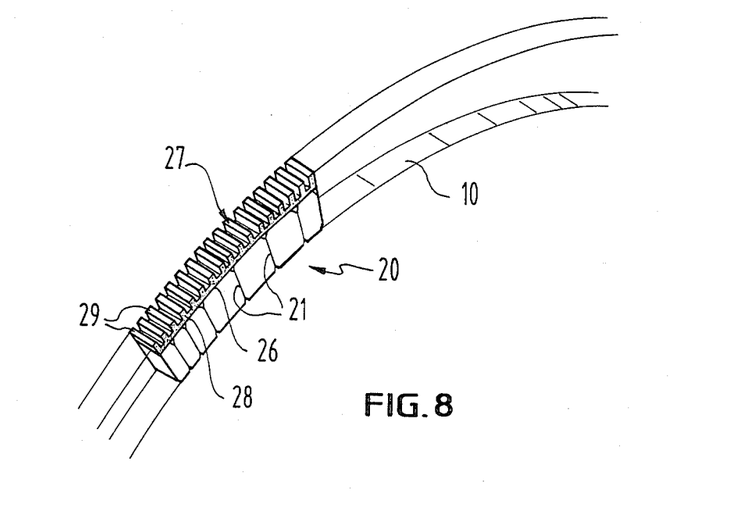
FIG. 8 is a second embodiment of a balance weight.

In accordance with a further aspect of the invention the mounting system of the invention comprises matched balance weights such as illustrated, for example, in FIGS. 7 and 8. These balance weights 20 are made, as known per se, of lead or a lead alloy and are configured as annular segments having a cross-sectional profile and a diameter matched to the diameter and the cross-sectional profile of the groove 10 in such a way that said annular segments 20 may be placed within the groove 10 without obstructing the mounting of an annular cover 30, 40, 50 or 60. Said annular segments 20 are provided at regular intervals with radially extending predetermined breaking points 21 so that mutually interconnected single weights of respectively different weight are provided. In the embodiment illustrated in FIG. 7, the dimensions of the annular segments 20 are substantially matched to the profile of the groove 10, so that said annular segments 20 may be inserted into the groove 10 with hardly any play. To secure the annular segments 20 at a certain location within the groove 10, small pads 24 and 25 are additionally provided which are made of elastic material such as rubber or another elastic plastics material and have cross-sectional dimensions slightly exceeding the profile of the groove 10. These rubber pads 24 and 25 are urged under elastic deformation into the groove 10 adjacent the two end faces 22 and 23 of the annular segments and thereupon permanently retain the annular segment 20 in the predetermined location.

According to an especially preferred alternative embodiment illustrated in FIG. 8, the annular segments 20, which are also provided with predetermined breaking points, have a smaller width than the groove 10. A friction material 27 is provided on one peripheral wall, preferably on the outer peripheral wall 26. Said friction material 27 may be an elastically deformable material such as rubber or the like. As illustrated in FIG. 8, it is especially preferred that said friction material 27 is a tape 28 of rubber or another elastic plastics material provided with teeth or serrations 29 and bonded to the peripheral wall 26 of the annular segment 20. When an annular segment 20 is urged into the groove 10, the teeth or serrations 29 of the tape 28 undergo elastic deformation and ensure a permanent, reliable clamping fit of the balance weight 20 within the groove 10 at the predetermined location. To obtain a balance weight having a predetermined weight from existing annular segments 20, the annular segment 20 is separated along a predetermined breaking point 21, and the serrated or toothed tape 28 is severed thereat.

As has been explained above, the invention provides an "invisible" balance weight mounting on a wheel rim equipped with a groove for accommodating matched balance weights. The balance weights provided in accordance with the invention may be secured in such a groove, at a predetermined location for easy removal, while fastening means extending from the groove and/or any damage to the groove are not required.

We claim:

1. A concealed balancing system for a motor vehicle wheel comprising a light-weight wheel rim including a flat rim flange extending substantially radially, the rim flange including first and second flat flange surfaces and a continuous axial recess forming an annular-outwardly opening groove in the first flange surface; balance weights adapted for being completely baused and secured within the groove; and an annular cover including fastening means cooperatively arranged with the cover for releaseably clamping the annular cover to the rim flange, the annular cover having an angular cross-sectional profile including a relatively wide, radially extending first leg comprising a flat ring portion covering the groove and adjacent portions of the flat rim flange and a relatively narrow, axially extending second leg provided on the periphery of the first leg, the fastening means comprising a continuous projection formed integrally with the inside of said second leg and being adapted to engage in an annular recess on a side of the rim flange and the flat ring portion having a side which is even with the second flange surface whereby the cover is integrated into the wheel rim design to provide a nearly unnoticeable balancing system.

2. The concealed balancing system according to claim 1 wherein the continuous projection has a wedge-like cross-section.

3. The concealed balancing system according to claim 1 wherein a continuous shoulder separates the first and second flange surfaces of the flat rim flange, said continuous shoulder being sufficient for inserting the first leg of the annular cover and disposing the side of said annular cover flush with the second surface of the flat rim flange, and wherein the annular groove is formed underneath the first flat surface.

4. The concealed balancing system according to claim 1 wherein the annular cover is made from a metallic material.

5. The concealed balancing system according to claim 4 wherein the metallic material comprises a thin sheet-metal of stainless steel.

6. The concealed balancing system according to claim 4 wherein the metallic material comprises aluminum.

7. The concealed balancing system according to claim 4 wherein the metallic material comprises an aluminum alloy.

8. The concealed balancing system according to claim 4 wherein the wheel rim is made from a metallic material identical to the metallic material of the annular cover.

9. The concealed balancing system according to claim 1 wherein the annular cover is made from a durable plastic material.

10. The concealed balancing system according to claim 9 wherein the ring portion comprises a plastic material and at least a visible surface of the ring portion is provided with a thin metallic coating that matches the appearance of the rim.

* * * * *